US010342372B2

(12) United States Patent
Farris

(10) Patent No.: US 10,342,372 B2
(45) Date of Patent: Jul. 9, 2019

(54) COMBINATION BRACKET AND GARMENT HANGER SYSTEM AND ASSEMBLY MOUNTABLE TO AN OVERHEAD TRIM PIECE ASSOCIATED WITH A DOORWAY SUCH AS FOR ROTATABLY SUPPORTING A GARMENT DURING STEAM CLEANING

(71) Applicant: Anthony C. Farris, Canton, MI (US)

(72) Inventor: Anthony C. Farris, Canton, MI (US)

( * ) Notice: Subject to any disclaimer, the term of this patent is extended or adjusted under 35 U.S.C. 154(b) by 429 days.

(21) Appl. No.: 15/333,800

(22) Filed: Oct. 25, 2016

(65) Prior Publication Data

US 2017/0035229 A1 Feb. 9, 2017

Related U.S. Application Data

(63) Continuation-in-part of application No. 13/785,941, filed on Mar. 5, 2013, now Pat. No. 9,474,400.
(Continued)

(51) Int. Cl.
*A47G 25/02* (2006.01)
*A47G 25/32* (2006.01)
(Continued)

(52) U.S. Cl.
CPC ......... *A47G 25/02* (2013.01); *A47G 25/0607* (2013.01); *A47G 25/32* (2013.01);
(Continued)

(58) Field of Classification Search
CPC ............... A47G 25/02; A47G 25/0607; A47G 25/0614; A47G 25/32; F16B 2/12; F16B 7/105
See application file for complete search history.

(56) References Cited

U.S. PATENT DOCUMENTS 3,927,741 A * 12/1975 Rubinstein ............. A45C 13/18
190/101
3,978,601 A 9/1976 Catron
(Continued)

FOREIGN PATENT DOCUMENTS

JP 09135993 A 5/1997
JP 2001149209 A 6/2001
(Continued)

OTHER PUBLICATIONS

International Search Report—International application No. PCT/US 2013/051321.

*Primary Examiner* — Nathan E Durham
(74) *Attorney, Agent, or Firm* — Dinsmore & Shohl, LLP

(57) ABSTRACT

A hanger system including at least an upper assembly affixed to a vertically suspending location and which, in combination with a lower assembly, supports and tensions a garment therebetween to assist in either or both of de-wrinkling or steam assisted cleaning of the garment. The upper assembly includes vertically respositionable upper and lower support surface (e.g. door jamb) engaging portions. A stem extends downwardly from the upper assembly and is linearly repositionable in order to adjust a height of a garment. The stem can be integrated into a triangular shaped support member having clips defined upon a lower width extending member of a triangular frame supported by the stem. The lower assembly includes an inverted triangular design with additional clips for securing lower edge extending locations of the garment and which is also weighted to facilitate the steam cleaning and de-wrinkling process.

20 Claims, 19 Drawing Sheets

Related U.S. Application Data

(60) Provisional application No. 61/676,687, filed on Jul. 27, 2012.

(51) Int. Cl.
  *A47G 25/06* (2006.01)
  *A47G 25/40* (2006.01)
  *A47G 25/68* (2006.01)
  *F16B 7/10* (2006.01)
  *F16B 2/12* (2006.01)

(52) U.S. Cl.
  CPC ......... *A47G 25/4023* (2013.01); *A47G 25/68* (2013.01); *F16B 7/105* (2013.01); *F16B 2/12* (2013.01)

(56) References Cited

U.S. PATENT DOCUMENTS

| | | | |
|---|---|---|---|
| 4,523,701 A * | 6/1985 | Armbruster | A47G 25/32 211/87.01 |
| 5,075,445 A | 12/1991 | Jarvest et al. | |
| 5,145,098 A | 9/1992 | Tung | |
| 5,276,949 A * | 1/1994 | Cordellini | F16B 2/12 24/525 |
| 5,503,311 A | 4/1996 | Chen | |
| 5,601,219 A * | 2/1997 | Chen | A47G 25/28 223/85 |
| 5,826,759 A * | 10/1998 | Ohsugi | A47G 25/32 223/85 |
| 6,189,708 B1 | 2/2001 | McNeece | |
| 6,820,849 B2 * | 11/2004 | Kennard | F21V 21/088 248/231.61 |
| 7,647,084 B2 | 1/2010 | Eghbal et al. | |
| 8,056,977 B2 | 11/2011 | Hinkle et al. | |
| 2008/0217364 A1 | 9/2008 | Fong | |
| 2011/0139832 A1 | 6/2011 | Camp | |
| 2012/0104056 A1 | 5/2012 | Mainetti et al. | |
| 2012/0138640 A1 | 6/2012 | Lin | |

FOREIGN PATENT DOCUMENTS

| | | |
|---|---|---|
| RU | 2120222 C1 | 10/1998 |
| RU | 2130537 C1 | 5/1999 |
| RU | 2003117689 A | 1/2005 |
| RU | 52688 U1 | 4/2006 |
| RU | 74279 U1 | 6/2008 |
| RU | 2335452 C2 | 10/2008 |
| RU | 2384290 C2 | 3/2010 |
| SU | 854763 A1 | 8/1981 |
| SU | 1651896 A1 | 5/1991 |

\* cited by examiner

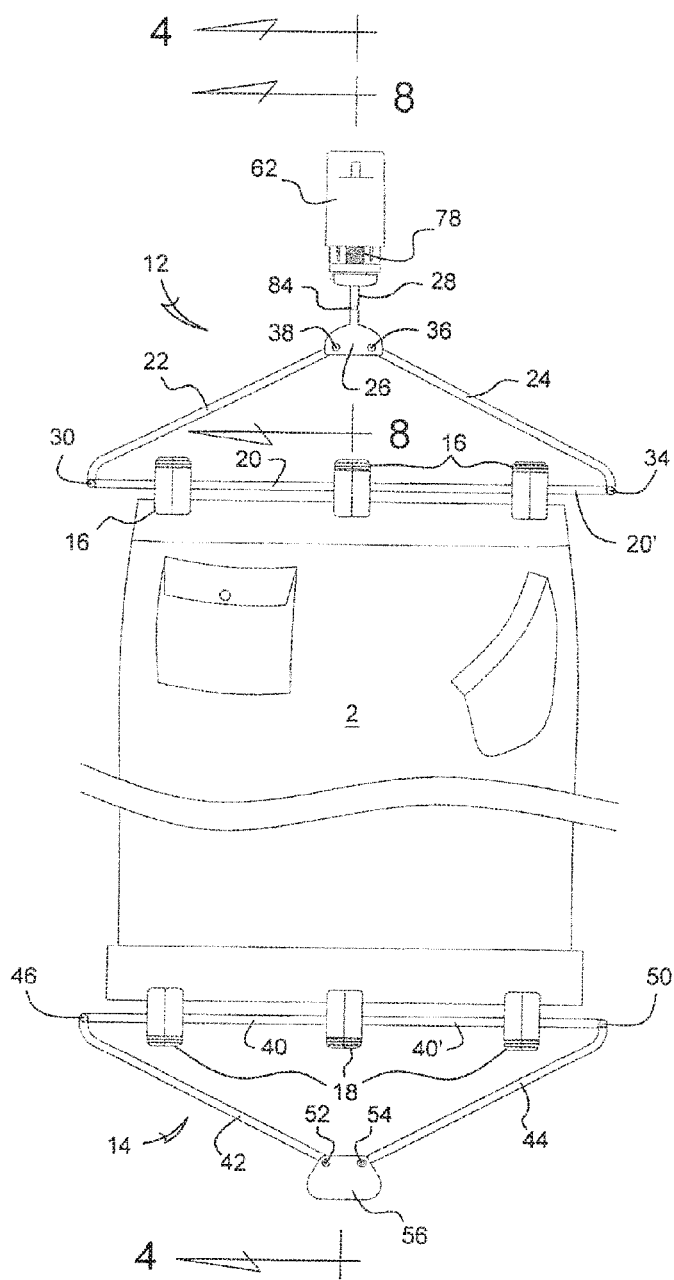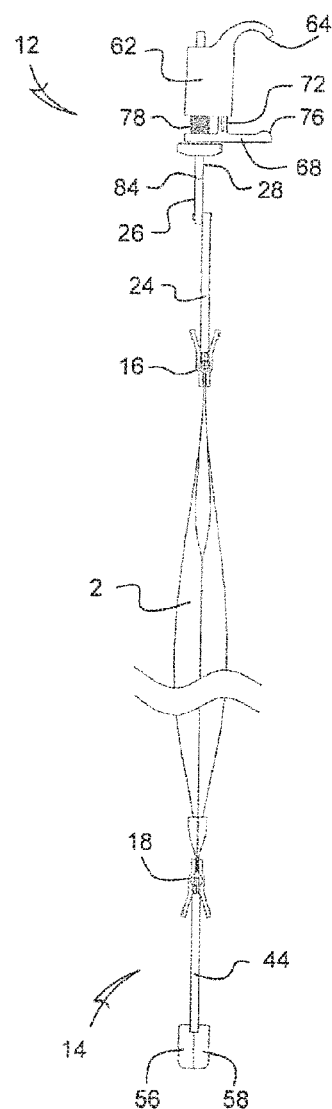
FIGURE 2
FIGURE 3

COMBINATION BRACKET AND GARMENT HANGER SYSTEM AND ASSEMBLY MOUNTABLE TO AN OVERHEAD TRIM PIECE ASSOCIATED WITH A DOORWAY SUCH AS FOR ROTATABLY SUPPORTING A GARMENT DURING STEAM CLEANING

CROSS-REFERENCE TO RELATED APPLICATIONS

This Application is a continuation in part of U.S. Ser. No. 13/785,941, filed Mar. 5, 2013, which in turn claims the priority of U.S. Provisional Application 61/676,687 filed on Jul. 27, 2012, the contents of which are incorporated herein in its entirety.

FIELD OF THE INVENTION

The present invention generally describes a garment hanger. More specifically, the present invention teaches a combination bracket and garment hanger assembly such as which is capable of being secured to an overhead extending doorway trim piece for rotatably supporting a garment during such as steam cleaning. The hanger system and assembly contemplates a number of variants in which an adjustable upper assembly is secured at the overhead supporting location and from which is suspended a garment in rotatable fashion. In combination, a separate and lower, typically weighted and engaging/tensioning, assembly is secured to the bottom of the garment and, with the upper assembly, facilitates any steam cleaning or like process for cleaning or de-wrinkling the garment.

BACKGROUND OF THE INVENTION

The prior art is documented with various types of clothing hangers, these suitably provided for hanging items of clothing. Shortcomings associated with known hanger designs include their unsuitability for assisting in dry or steam cleaning of clothing, such as which often requires both tensioning of the garment and the ability to easily rotate the same during the associated process.

SUMMARY OF THE INVENTION

The present invention discloses a hanger system including an upper assembly supported at an elevated location and, in combination with a lower assembly, both supports and tensions a garment therebetween to assist in either or both of de-wrinkling or steam assisted cleaning of the garment. The upper assembly includes vertically respositionable upper and lower support surface (e.g. doorjamb) engaging portions.

In one embodiment, the upper and lower engaging portions include clamping members adapted to engage opposite edge surfaces of a vertical door jamb. The clamping members are spatially repositioned by an exteriorly threaded vertical shaft which extends between the clamping members and which threadably adjusts the upper clamping member in directions towards and away from the lower clamping member.

A stem extends downwardly from the upper assembly, such as through a hollow interior of the shaft, and is linearly repositionable, such as via a combination knob and detent mechanism, in order to adjust a height of a garment supported at an end-most location of the adjustable stem, in one application, the stem concludes in an integrated and arcuate support location exhibiting a curved upper profile for supporting a hook portion of a conventional clothes hanger.

In another application, the stem concludes in a triangular frame, with clips defined upon a lower width extending member of a triangular frame supported by the stem. A lower assembly can be provided and includes an inverted triangular design with additional clips for securing lower edge extending locations of the garment and which is also weighted to facilitate the steam cleaning and de-wrinkling process.

BRIEF DESCRIPTION OF THE DRAWINGS

Reference will now be made to the attached drawings, when read in combination with the following detailed description, wherein like reference numerals refer to like parts throughout the several views, and in which:

FIG. 2 is a plan view of the hanger system in FIG. 1 and depicting the upper and lower assemblies gripping a garment therebetween;

FIG. 3 is a side view of the system in FIG. 2;

DETAILED DESCRIPTION OF THE PREFERRED EMBODIMENTS

As previously described, the present invention teaches a hanger system and assembly for such as which is capable of being secured to an overhead extending doorway trim piece for rotatably supporting a garment during such as steam cleaning and other de-wrinkling procedures. The advantages of the bracket assembly include the ability to securely and controllably support a garment during cleaning or long periods of tensioning/stretching, such understood to be not limited to any specific type of cleaning process or procedure.

Figure 1:
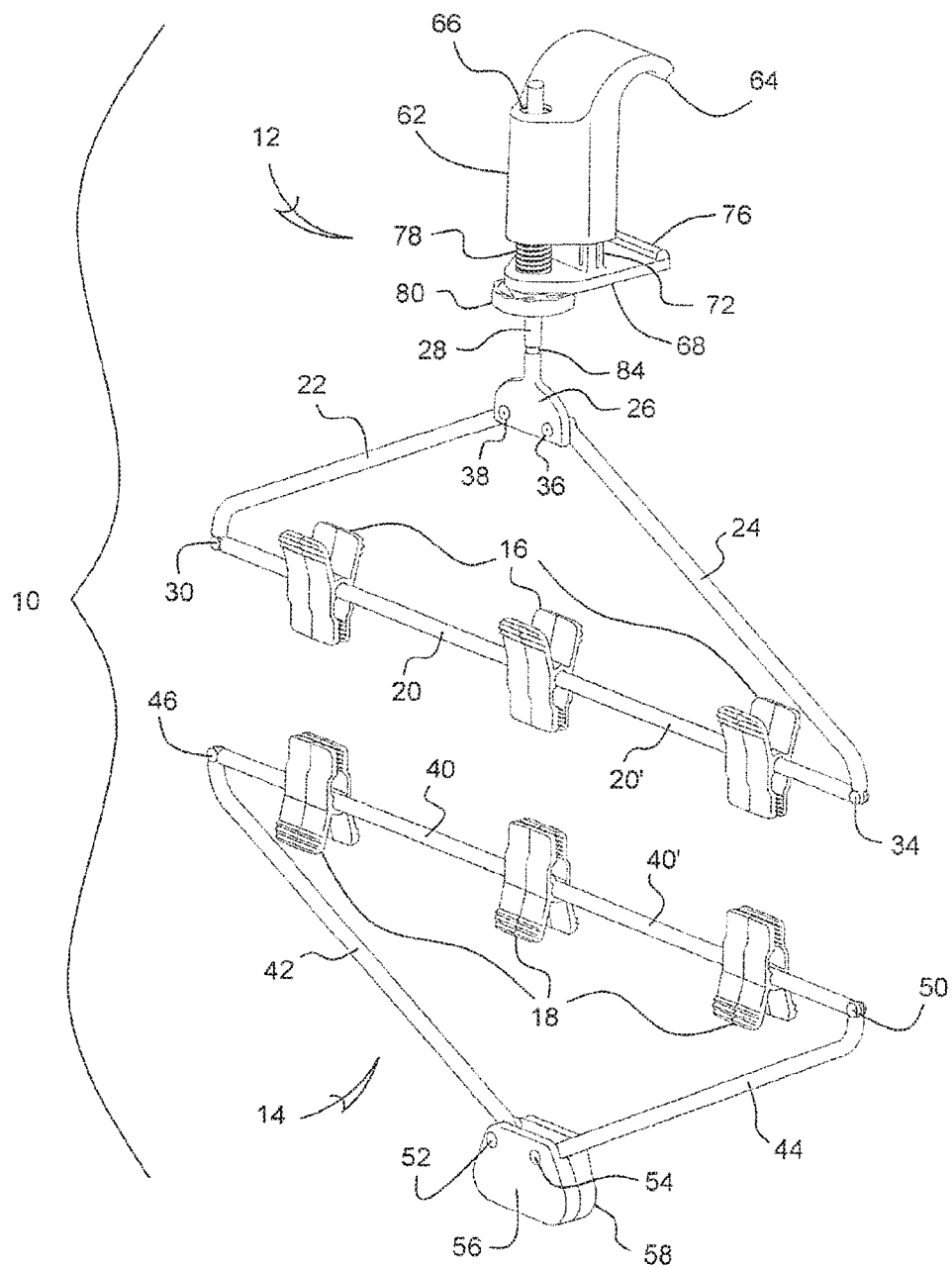
FIG. 1 is a perspective view of the hanger system according to a first embodiment and which depicts both spring biased and supported upper assembly and lower tensioning/weighting assembly.

FIG. 1 is a perspective view of the hanger system according to a first embodiment, generally at 10, and which depicts both spring biased and supported upper assembly 12 and a lower tensioning/weighting assembly 14. As further shown in the plan view of FIG. 2, the upper 12 and lower 14 assemblies grip a garment, depicted at 2, therebetween through the provision of any plurality of upper 16 and lower 18 clips or biasing clamps, these further being constructed in any known fashion and of any suitable material exhibiting with an intermediate spring element disposed between a pair of outer jaws and which are biased in a closed and gripping condition about an edge location of the fabric associated with the garment 2. It is further understood that, while the lower assembly 14 is exhibited as a component of one variant of the system in which tensioning/stretching of the garment occurs, the present invention contemplates alternate variants in which only the upper assembly 12 may be utilized in order to securely and rotatably support the garment at an elevated support location.

As further best shown in FIG. 1, the lower suspending portion of the upper assembly includes a triangular shaped frame with a central member (defined as pivotally split halves 20 and 20') supporting the clamps 16 in spaced apart fashion and which are interconnected at opposite ends by a pair of angled side members 22 and 24, these converging at an upper end in a further pivotal support member 26, in turn defining a lower extending end of an elongated stem 28. As further shown in FIG. 10, a plurality of pivot pins 30, 32, and 34 are arranged in spaced apart fashion between the split halves 20 and 20' and the angled sides 22 and 24, with an upper pair of pins 36 and 38 pivotally supporting the upper converting ends of the angled sides 22 and 24 with the pivotal support member 26.

The lower assembly 14 likewise includes an inverted triangular shaped frame with an upper extending (typically split half) central member, see split halves 40 and 40', with a pair of angled side members 42 and 44. A like plurality of pivot pins are shown at 46, 48 and 50 defined at the inverted split portions 40 and 40' and the upper supported ends of the angled sides 42 and 44, with additional pivot pins 52 and 54 supporting lower converging ends of the angled sides 42 and 44 with pivotal locations associated with a lower miniature housing (defined by split halves 56 and 58 in FIG. 10).

Figure 5:
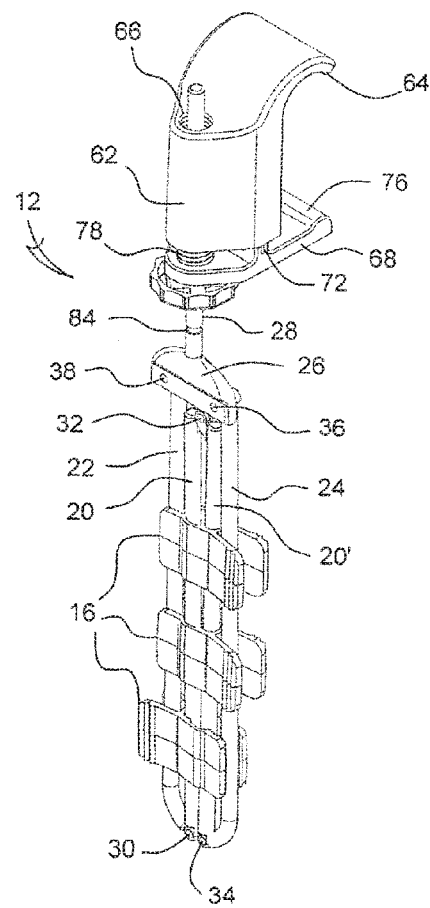
FIG. 5 is a folded storage view in perspective of the upper assembly.
Figure 6:
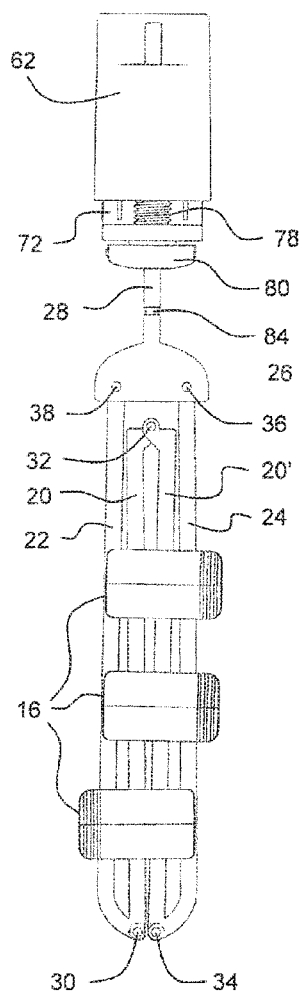
FIG. 6 is a front plan view of FIG. 5 and better showing the inter-articulating nature of the three triangular frame defining sides of the upper assembly arranged in their inter-pivoting and stored position.
Figure 7:
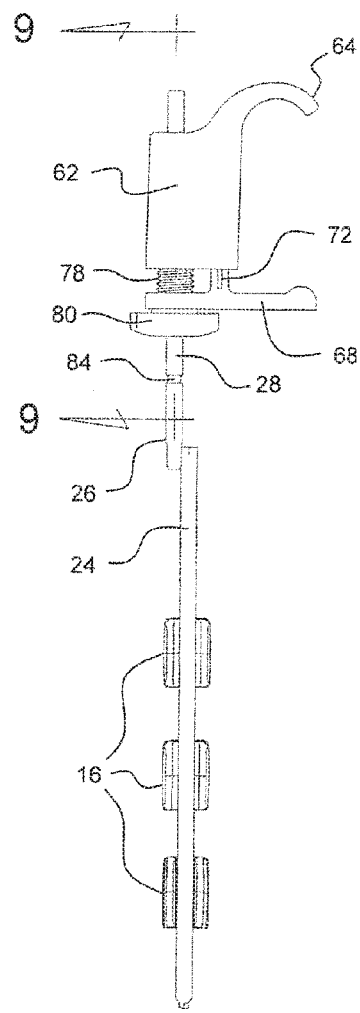
FIG. 7 is a side view of FIG. 5.

In this manner, both the upper hanger assembly 12 and. lower tensioning assembly 14 are inter-articulating and, in use can incorporate any press-pin or other suitable features for collapsing each pivotal connection to permit the frames to be folded up for storage or portable transport, such as depicted in each of FIGS. 5-7 in reference to the upper assembly. As further shown, in FIG. 10, a small weighted portion 60 can be seated within the housing and, in use, to provide the necessary degree of weighting/tensioning exerted upon the subassembly and the lower engaged ends of the garment 2, thereby stretching the same in the manner depicted in the reduced length views of FIGS. 2 and 3.

Figure 4:
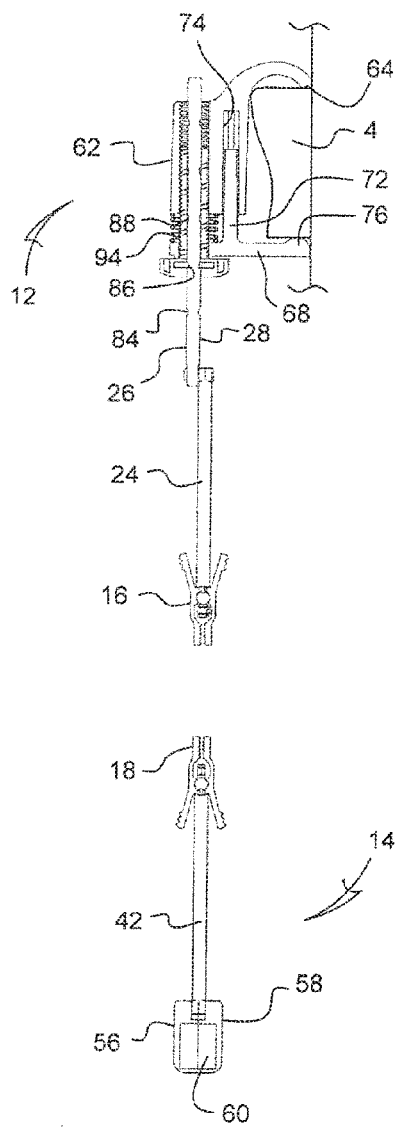
FIG. 4 is a cutaway view taken along line 4-4 of FIG. 2 and illustrating the inner construction of the upper and lower assemblies for providing both elevated support to the garment stretched between the upper and lower assemblies.
Figure 8:
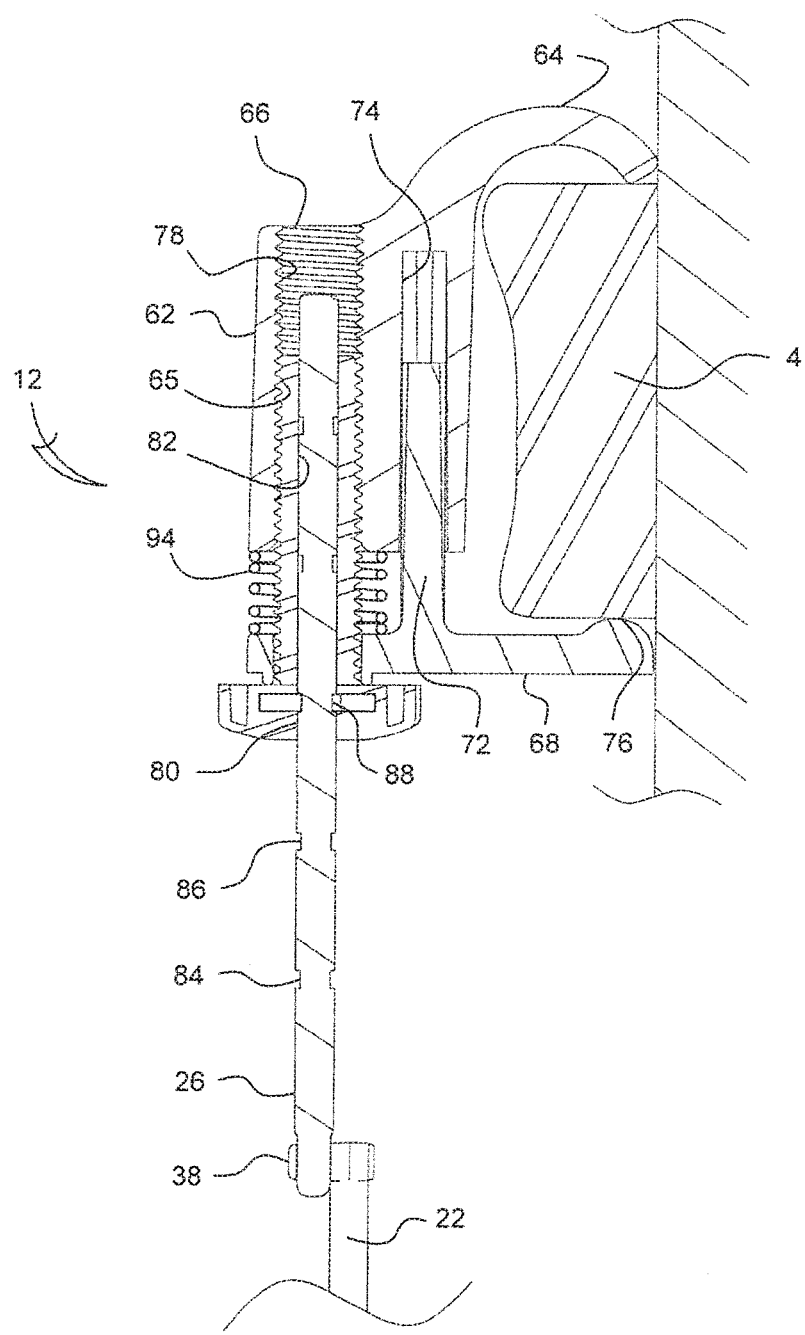
FIG. 8 is a cutaway view taken along line 8-8 of FIG. 2 and showing better depicting the interior architecture of the upper assembly.

The upper assembly in the initial variant 12 of FIGS. 1-10 also includes an upper-most body which defines a housing 62 with a configured hook end 64 adapted for engaging an upper surface of a horizontal extending support location, such as a door jamb 4 as represented in each of FIGS. 4 and 8. As best shown in the cutaway of FIG. 8, the housing 62 includes an underneath accessible and threaded interior recess 65 extending through an open top 66.

A support bracket includes a bottom plate 68 with an annular recess 70 (see FIG. 10) defined therein, as well as having a perpendicularly extending and thin body seating profile 72 for seating within a recess 74 defined in the upper housing 62 in a vertically displaceable permitting manner as shown in FIG. 8. The bottom plate 68 further includes an embossed lip edge, at 76, for engaging the lower surface of the elevated door jamb 4 (again FIGS. 4 and 8).

A modified threaded bolt fastener includes a threaded shaft 78 and a modified head 80. As again best shown in the cutaway of FIG. 8, the shaft 78 is linearly recessed along its entire length, see inner radial wall 82, so that the stem 26 extends through its entirety and, depending upon the adjusted location of the stem relative to the upper housing, can range from projecting upwardly from the housing recess 66 in a most upwardly retracted position (FIG. 1) and in which a portion of the exteriorly threaded shaft 78 projects below the housing 62. The stem is further depicted lowered to an intermediate position (FIG. 8) in which a significant length of the stem 26 extends downwardly from the housing, as well as to a most-lowered position (not shown) in which the stem (along with its triangular frame and garment) is lowered to a maximum degree permitted by its construction.

As shown, the elongated stem 26 includes a plurality of keyed and annular extending recess locations, see at 84, 86, 88, 90 and 92 et seq., extending in linearly spaced intervals between a lower end and an upper most projecting end. A coil spring 94 can be provided and (is biased between the underside of the upper housing 62 and the upper surfaces of the bottom plate 68 in order to provide for quick release from the jamb 4 upon rotating the head 80 in a threaded loosening direction relative to the inner threaded profile of the housing within which the shaft 78 is inter-engaged. The spring 94 is an optional component for providing an additional biasing or cushioning aspect to the hanger assembly and is depicted in selected FIGS. 4, 8 and 10.

As previously indicated, the upper assembly provides for vertical lengthening/shortening adjustment of the stem 28 and which is enabled in part by the provision of a flattened disk or plate shaped detent 96 (see FIG. 10) in which is formed an inner aperture 98. The width wise interior architecture of the fastener head 80 is such that it is sufficiently hollowed to seat both a majority of the plate shaped detent 96 along with a biasing (e.g. coil) spring 100. The plate 96 is pre-positioned within the open interior of the fastener head 80 in a manner which permits the stem 28 to be pre-installed in upwardly displacing fashion a given distance through the interior of the bolt shaft 78, following which the biasing force of the coil spring 100 exerts a force on an end of the plate 96 so that its inner aperture (which is slot shaped to exhibit a distance greater than the largest diameter of the stem 28) is exerted into a keyed recess engaging condition (see at 102 in FIG. 9A) thereby locking the stem in linear position relative to the upper assembly.

Figure 9A:
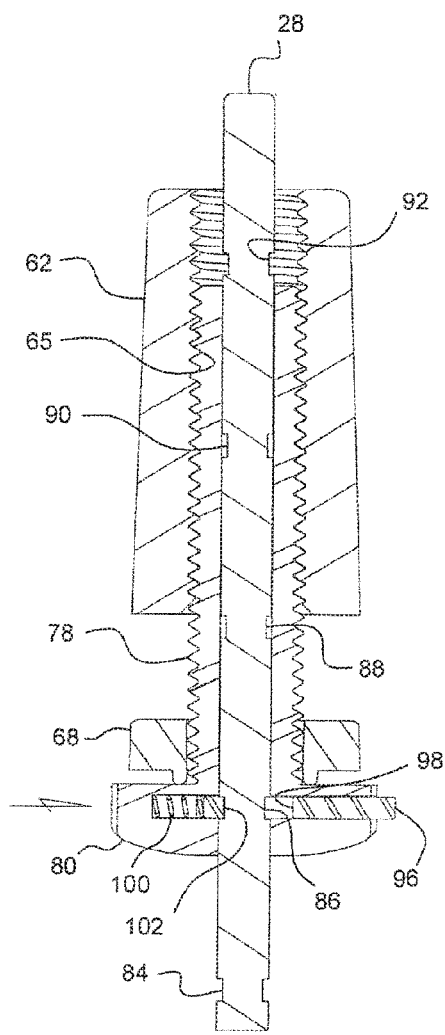
FIG. 9A is a cutaway corresponding to line 9-9 in FIG. 7 and showing a laterally biased detent built into a sliding disk component, the detent engaging with keyed recess location associated with an elongated inner stem extending downwardly from the upper assembly and which in this positions locks the stem in linear position relative to the upper assembly.
Figure 9B:
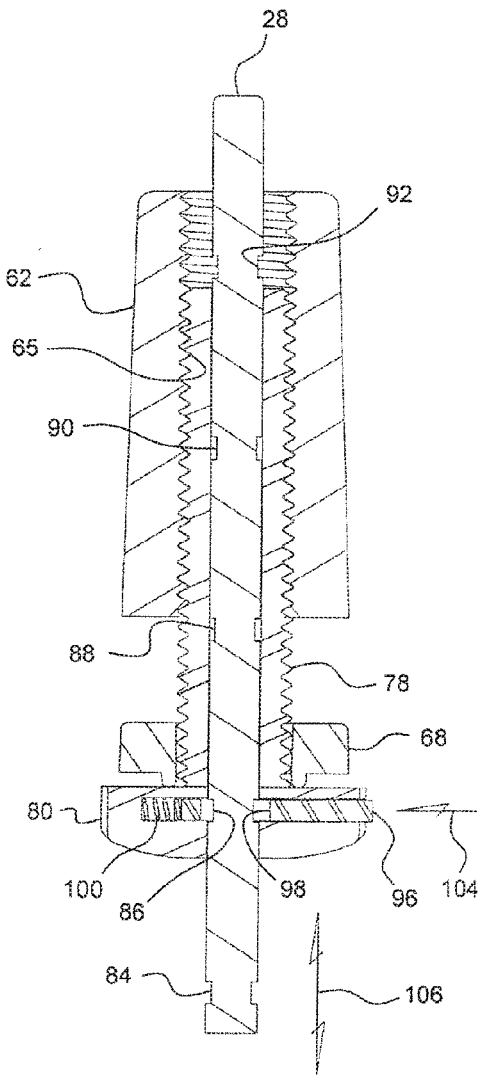
FIG. 9B is a succeeding view to FIG. 9A in which disk is inwardly compressed in order to unseat the detent from the keyed recess, thereby permitting vertical/linear repositioning of the inner stem relative to the fixed components of the upper assembly.

FIG. 9B is a succeeding view to FIG. 9A in which disk or plate 96 is inwardly compressed, see arrow 104, in a counter direction to the exerting force of the spring 100, thereby unseating the detent engaging location (again 102 in FIG. 9A) from the selected keyed recess 86. At this point, the stem 28 is permitted to be vertically/linearly repositioning in either up or down directions, see arrow 106, relative to the fixed components of the upper assembly, thus permitting the lower suspended hanger frame and associated garment to be raised or lowered. As further evident from the engaging architecture established between the spring detent and the stem, the design of the upper assembly is such that the stem 28 is permitted to be freely rotated at any vertically adjusted position.

Figure 11:
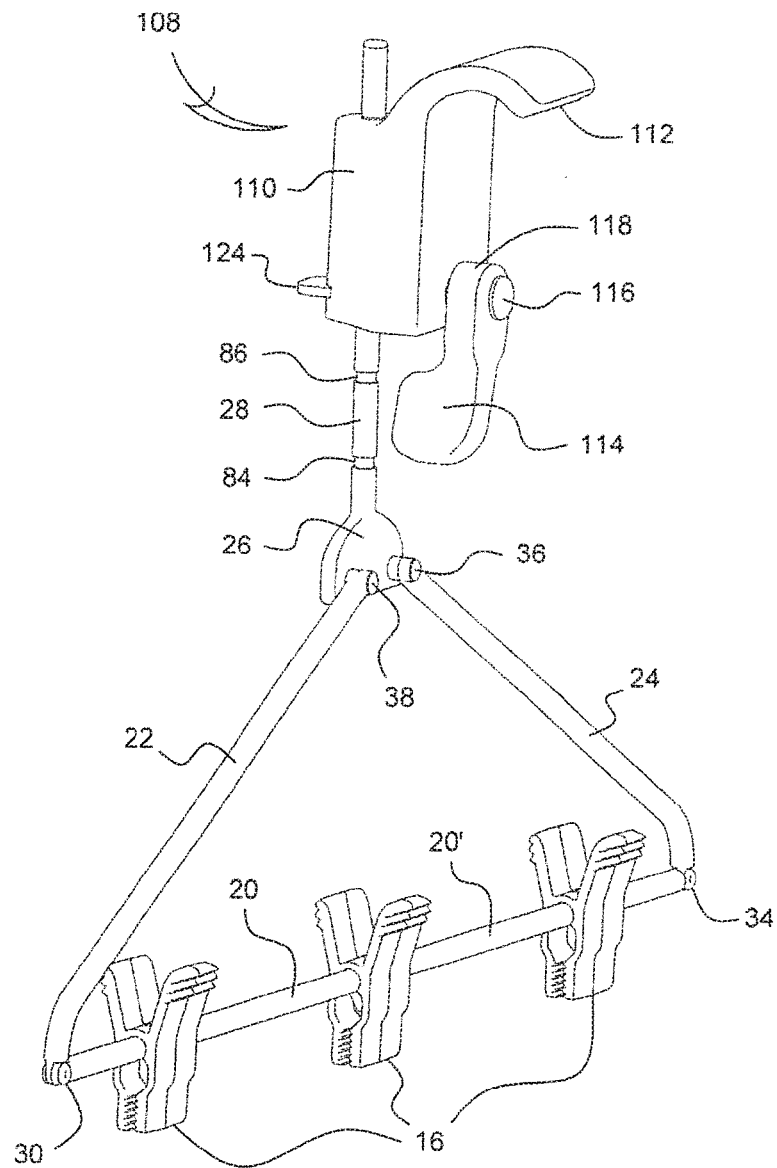
FIG. 11 is a perspective assembly view of an upper hanger assembly according to a further potential embodiment.
Figure 12:
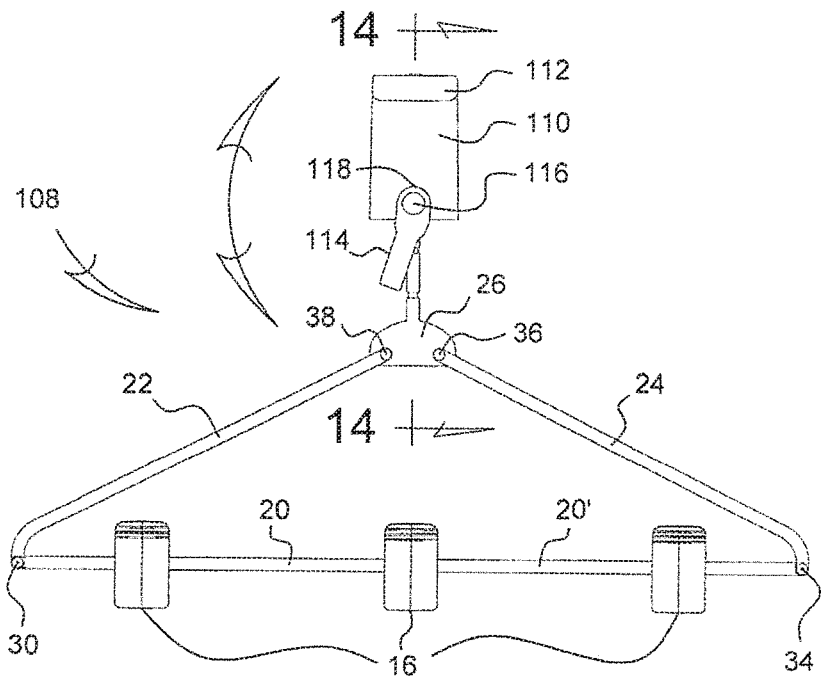
FIG. 12 is a front view of the upper assembly in FIG. 11.
Figure 13:
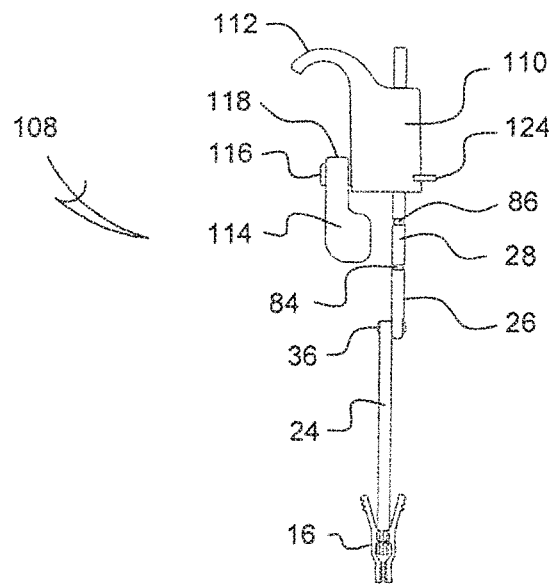
FIG. 13 is a rotated side view of the assembly in FIG. 11.

Referring now to FIG. 11-13, a series of perspective assembly, front and rotated side views are generally depicted at 108 of an upper hanger assembly according to a further potential embodiment and which is utilized with a stem 28 and lower hanger frame assembly consistent with that previously described. As is additionally depicted in the linear cutaway of FIG. 14 taken along line 14-14 of FIG. 12, an alternately configured upper assembly housing 110 is provided and again includes a downwardly configured hook edge 11 for engaging an upper horizontal surface associated with the elevated/overhead door jamb 4 (see FIG. 14).

A rotatable lever 114 is secured to a forward vertical surface of the housing 110, via a pivotal defining pin 116. The lever exhibits an upper engaging surface 118 associated with an underneath extending surface of the elevated jamb 4 or other suitable support and which, in combination with the upper hook engaging surface 112, allows for the lever 114 to quickly rotate the seating surface 118 into engagement with the jamb 4 to either quickly mount or dismount the hanger assembly to and from the elevated support location. As further shown in FIG. 14, an inner most extending portion 120 of the pin 116 can be mounted to the housing 110 in either a fixed or (alternately) an height adjustable fashion for permitting resizing of a separation distance between the upper hook edge 112 and lower engaging surface 118 in order to accommodate different dimensioned elevated support surfaces such as wider or narrower supports which vary from the standard width dimensions of an elevated jamb).

Figure 14:
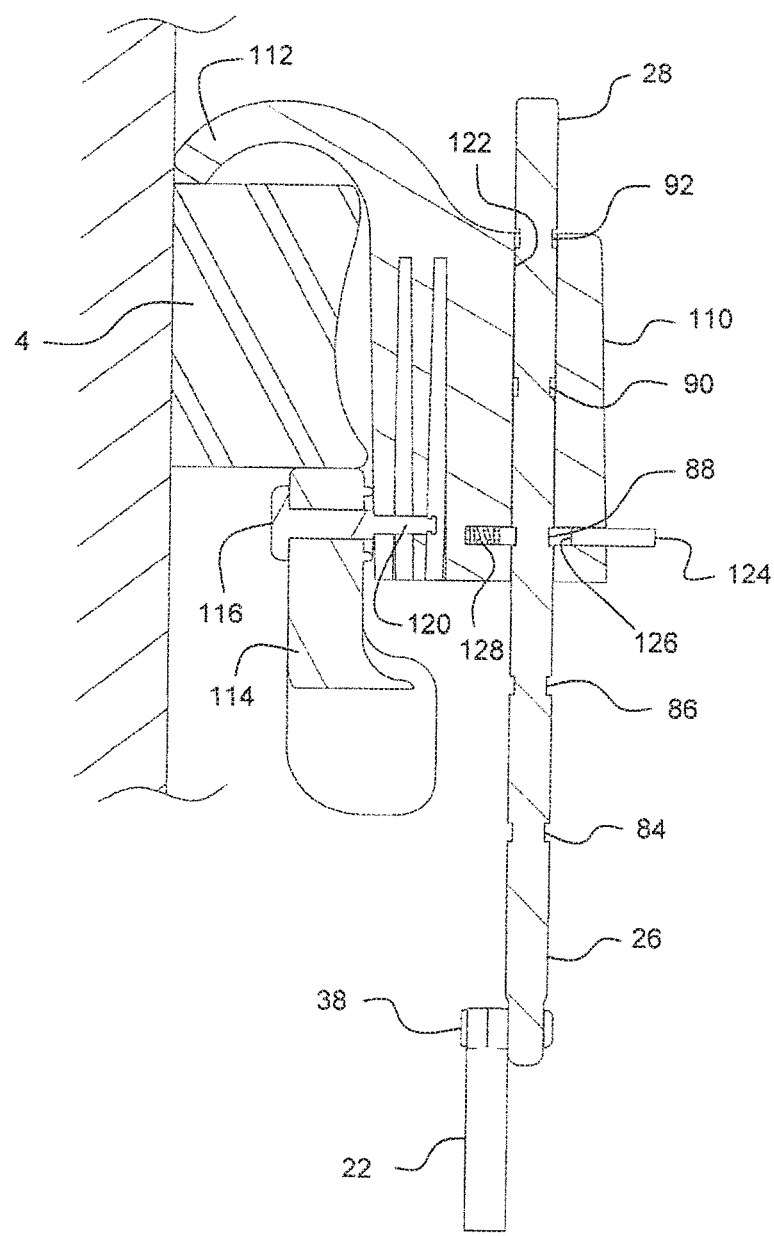
FIG. 14 is a linear cutaway taken along line 14-14 of FIG. 12 and showing the features of the laterally biased detent for effecting quick linear adjustment of the garment supporting stem, as well as the rotatable lever associated with an underneath engaging surface of the elevated support and which, in combination with the upper hook engaging surface, provides for quick dismounting of the hanger assembly from the elevated support location.

As again shown in FIG. 14, a vertical passageway (see inner radial wall 122) extends the entire height of the housing 110 and through which extends the stem 28. A variation of the laterally biased detent mechanism is provided and includes a plate shaped detent 124 similar to that previously depicted at 96 in FIG. 10 and Which includes an inner defined slot 126 with biasing spring 128 for effecting quick linear adjustment of the garment supporting stem between succeeding keyed recessed locations 84, 86, 88, et seq.

Figure 15:
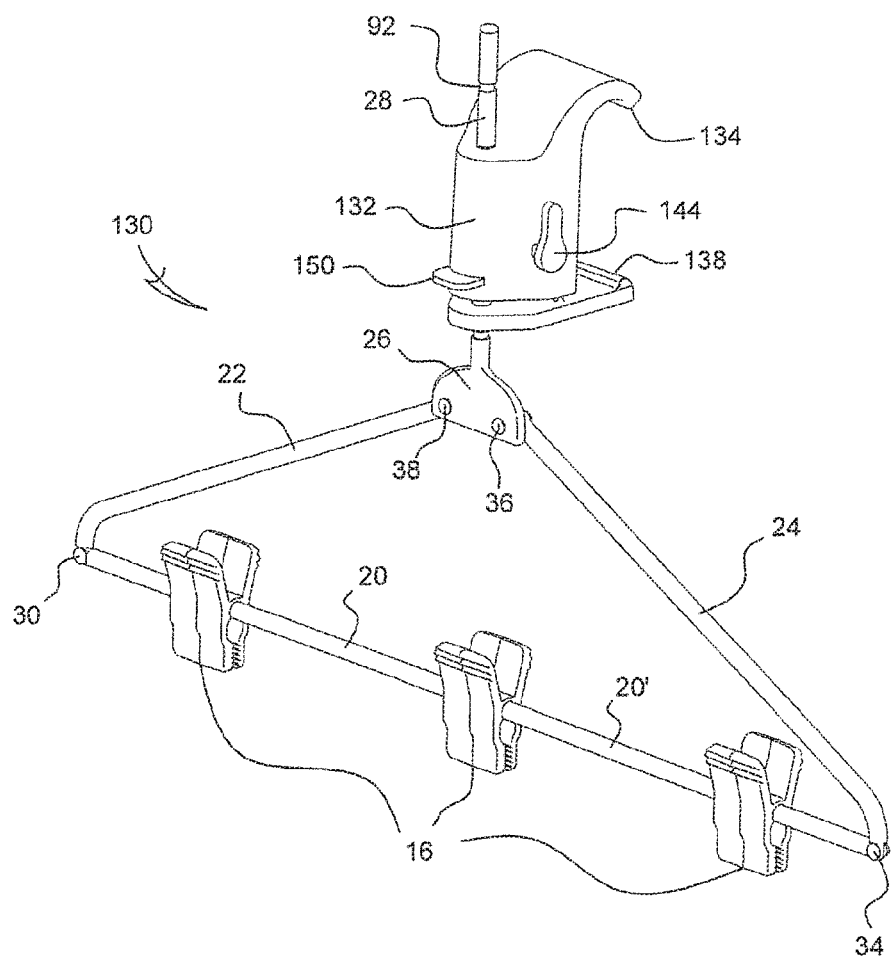
FIG. 15 is a perspective view of a variant of the upper hanger assembly in FIG. 11.
Figure 16:
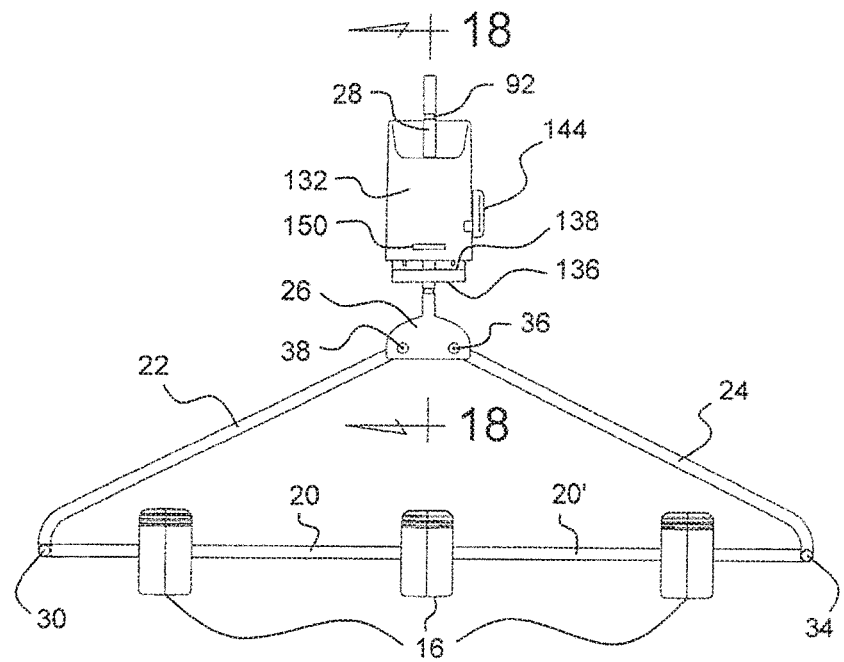
FIG. 16 is a front view of the assembly in FIG. 5.
Figure 17:
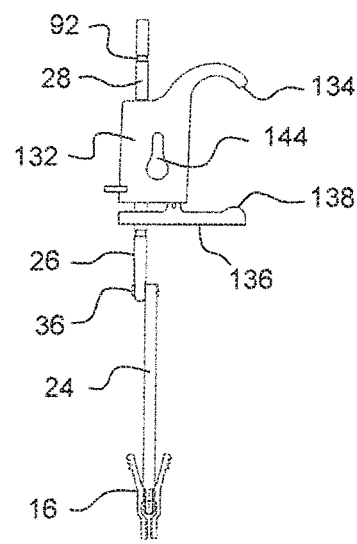
FIG. 17 is a side f the assembly in FIG. 15.
Figure 18:
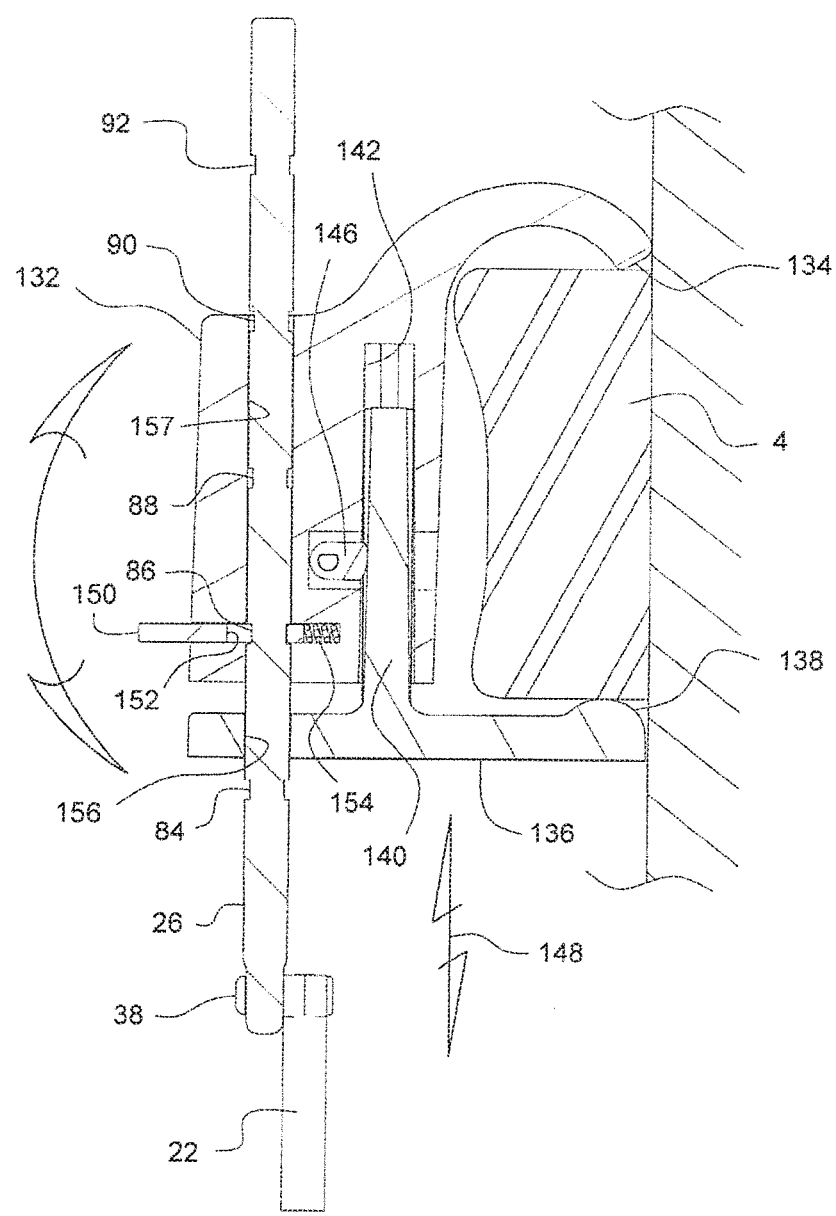
FIG. 18 is a linear cutaway taken along line 18-18 of FIG. 16 and depicting the interior configuration of the variant of FIG. 15 and which, corresponding to the cutaway of FIG. 14, illustrates another arrangement for providing a laterally biased detent for effecting quick linear adjustment of the garment supporting stem, as well as the rotatable lever associated with a side disposed surface of the elevated support and which, in combination with the upper hook engaging surface, provides for release of an inner supporting rod associated with a lower engaging surface for quick dismounting of the hanger assembly from the elevated support location.

Referring to FIGS. 15-17, a series of perspective, front and side views are depicted of a further variant 130 of the upper hanger assembly 108 in FIG. 11. A housing 132 is provided and again includes an upper and angled hook edge 134 for engaging the upper jamb 4 surface. A lower engaging plate support 136 includes an embossment 138 for engaging the underside jamb surface as shown in FIG. 18.

An inner support rod 140 (again FIG. 18) is integrally formed with and extends upwardly from the lower vertically adjustable plate 136 and is seated within a recessed vertically interior 142 of the housing 132. A sideways located lever 144 (FIGS. 15-17) is pivotally secured to the housing 132 and rotatably engages an inner cam 146 (FIG. 18) between a first engaged position relative to the rod 140 (shown) and a second ninety degree rotated and release position in which the rod 140 is permitted to be vertically readjusted (see directional arrow 148) in order to adjust a separation distance between the lower jamb engaging embossed location 138 and the upper angled hook edge 134.

A laterally biased detent mechanism is again provided (see FIG. 18) and includes a plate shaped detent 150 with an inner defined slot 152 with biasing spring 154 for effecting quick linear adjustment of the garment supporting stem between succeeding keyed recessed locations 84, 86, 88, et seq. As further shown, the stem 28 extends through aligning apertures 156 defined in the lower plate 136 and at 157 in the body of the housing 132, this in order to facilitate both vertical adjustability of the stem 28 as well as to provide additional stabilizing and anti-pivoting support to the plate 136 in combination with the seating of the support rod 140 within the vertically recessed profile 142.

Figure 19:
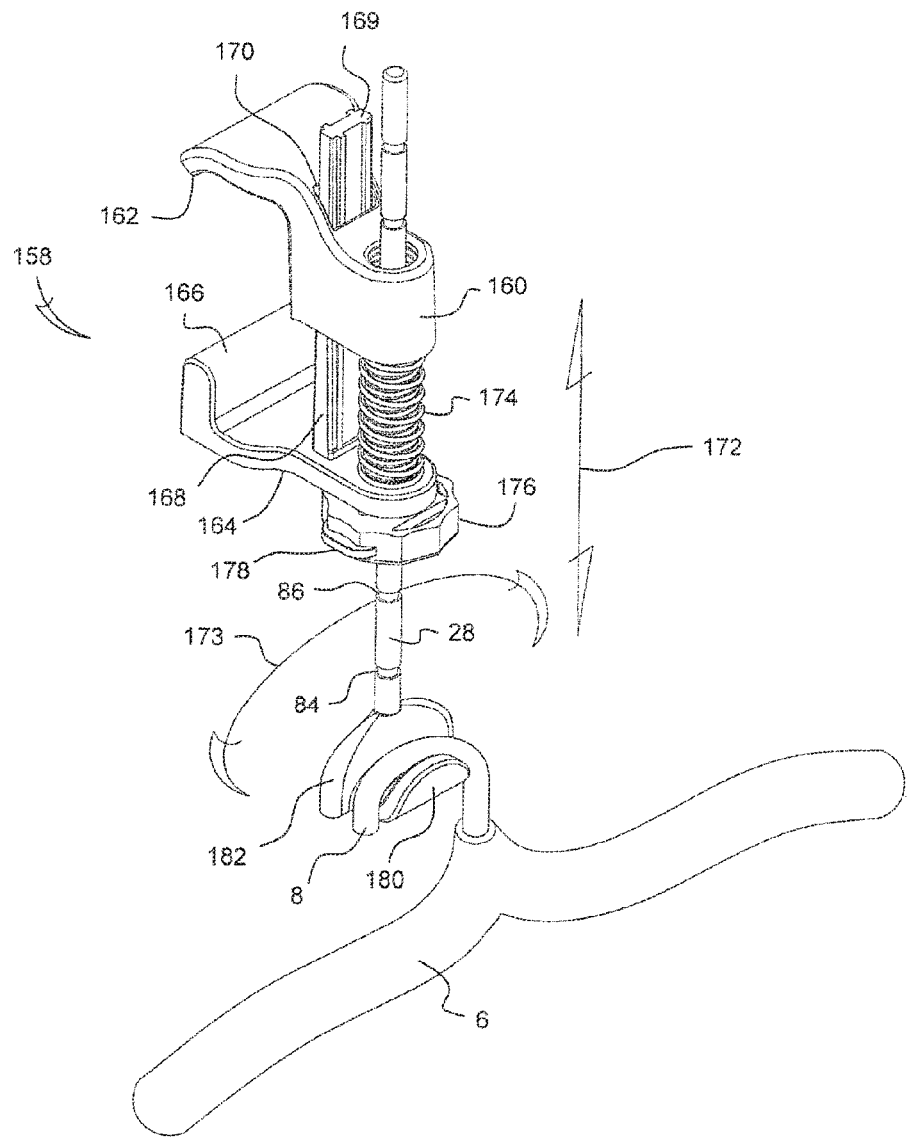
FIG. 19 is an illustration in perspective of a further ex. le of an alternately configured upper hanger assembly with spring biased cushioning displacement in combination with elevated support location engagement and linear stem adjustability.

FIG. 19 is an illustration in perspective at 158 of a further example of an alternately configured upper hanger assembly and which provides the features of spring biased cushioning displacement in combination with elevated support location engagement and linear stem adjustability. In particular, a two piece housing includes an upper clamping member 160 with an upper angled and jamb surface engaging hook edge 162, a corresponding separate lower clamping member 164 exhibiting an upper projecting edge 166 for engaging an underside extending jamb or other suitable elevated support surface.

An elongated pedestal 168 exhibiting a keyed cross sectional profile 169 extends integrally from the lower clamping member 164 and upwardly through a mating keyed recess profile 170 defined in the upper clamping member 160 for accommodating a range of separation adjustability between the clamping members 160 and 164. The stem 28 extends through aligning apertures not shown in this view) defined in spaced apart locations of the upper clamping member 160 and lower clamping member 164 relative to the vertically extending pedestal 168 and in order to provide stable hi-directional adjustability as indicated by arrow 172 as well as rotation of the stem 28 as further indicated by arrow 173.

A coil spring 174 seats about the stem 28 in separation biasing fashion between an underside seating surface of the upper clamping member 160 and a corresponding upper seating surface of the lower clamping member 164. A knob 176 is configured underneath the lower clamping member 164 and which can incorporate any suitable tab or slot or other structure for adjusting a separation distance between the jamb engaging surfaces of the clamping members.

Figure 10:
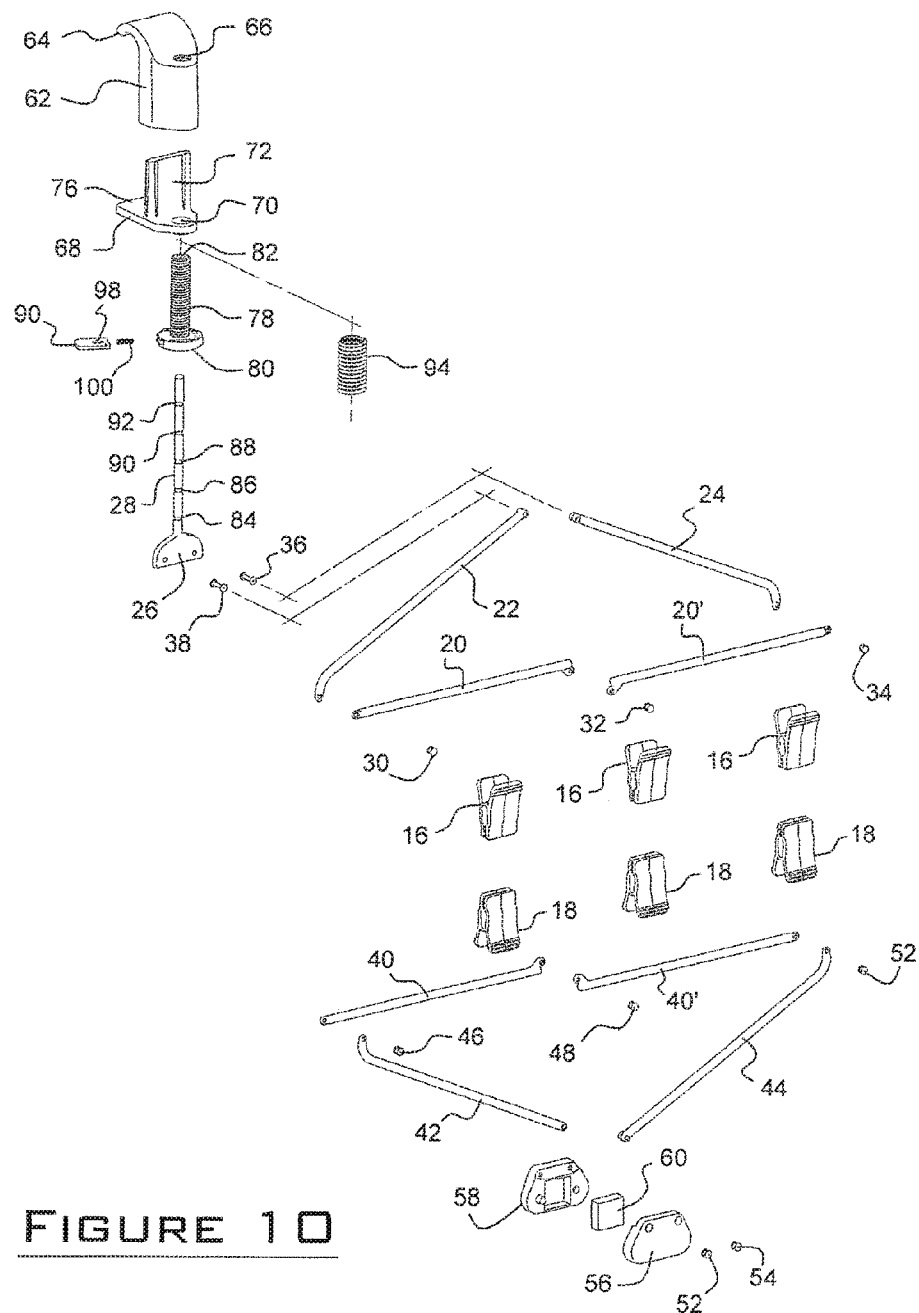
FIG. 10 is an exploded view of the system and assembly of FIG. 1.

A variation of the laterally biased detent mechanism is provided and includes a plate shaped detent 178 similar to that previously depicted at 96 in FIG. 10 which is laterally displaceably mounted within an open interior of the knob 176. As in previous embodiments, the detent 178 includes an inner defined slot (not shown) with biasing spring for effecting quick linear adjustment of the garment supporting stem between succeeding keyed recessed locations 84, 86, 88, et seq. Also shown is a conventional hanger 6 with upper hook engaging portion 8, this engaging a modified and arcuate support location 180 associated with a reconfigured lower portion 182 of the stem 28 according to the further variant.

Figure 20:
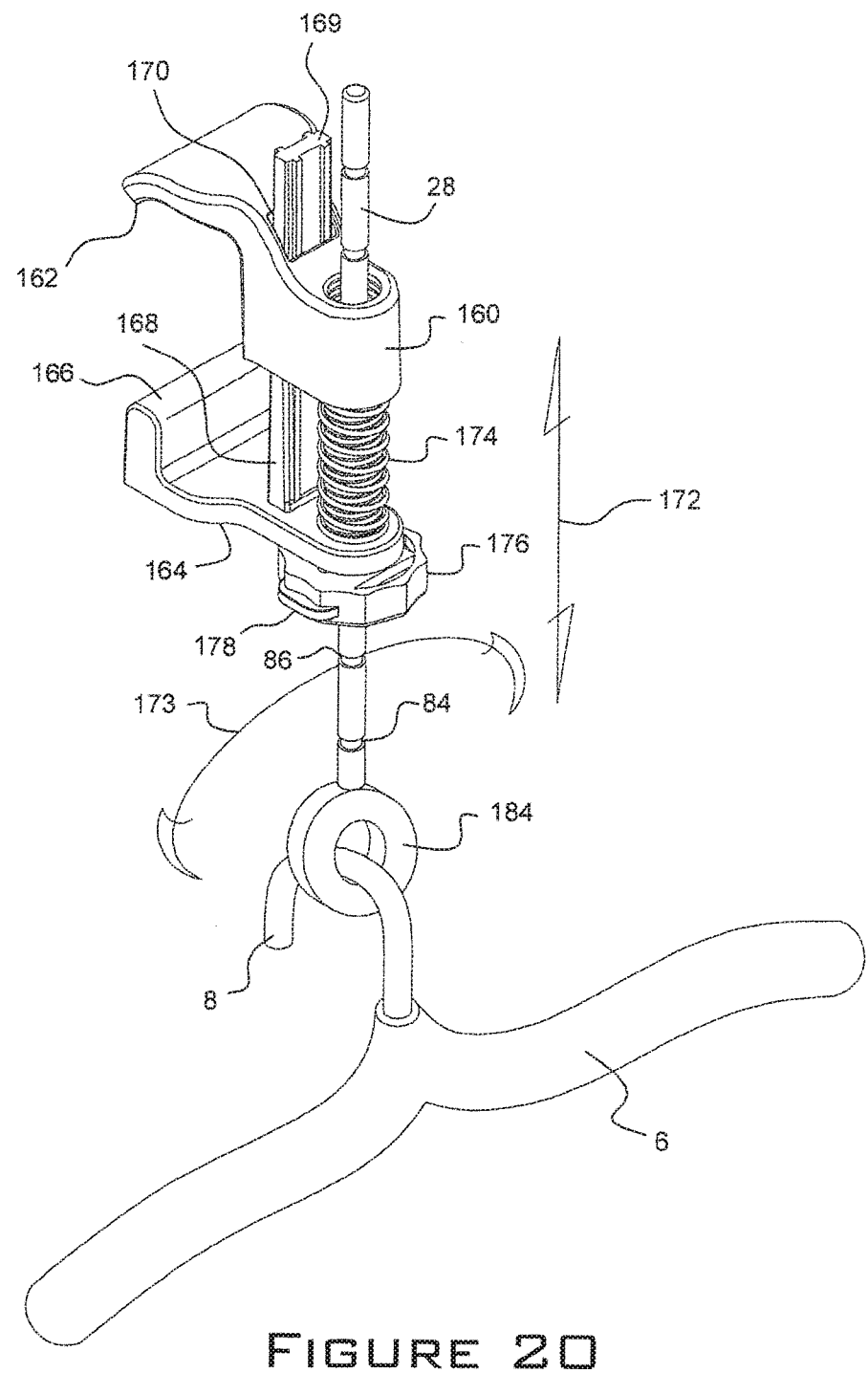
FIG. 20 is a variant of FIG. 19 exhibiting a different hanger supporting bottom stem configuration exhibited by a washer-like structure.
Figure 21:
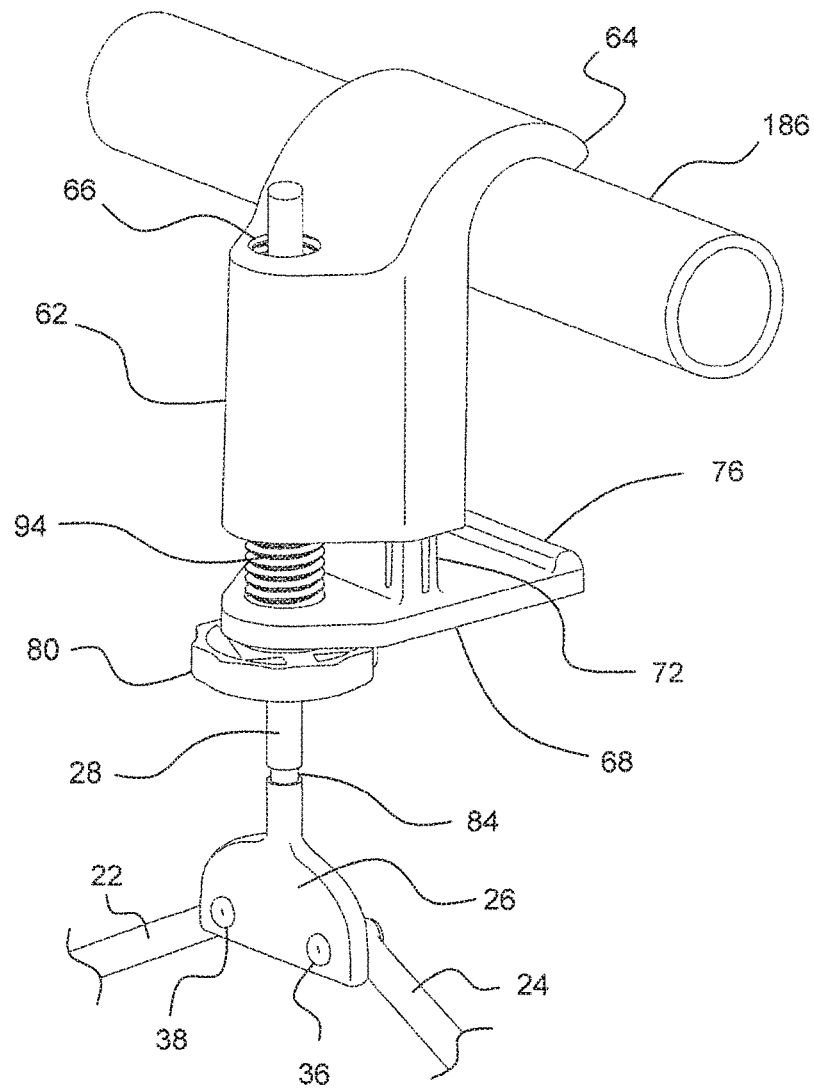
FIG. 21 is an illustration of the hanger assembly of FIG. 1 in a shower rod supporting application.

FIG. 20 is a variant of FIG. 19, identical in most respects, and exhibiting a different hanger supporting bottom stem configuration, at 184, exhibited by a washer-like structure for receiving the hook engaging portion 8 of the conventional clothes hanger 6. FIG. 21 is an illustration of the hanger assembly of FIG. 1 in a shower rod 186 supporting application and in which only the downwardly configured curved hook end 64 is employed for supporting the assembly upon the upper arcuate support surface established by the horizontally extending support rod 186.

Figure 22:
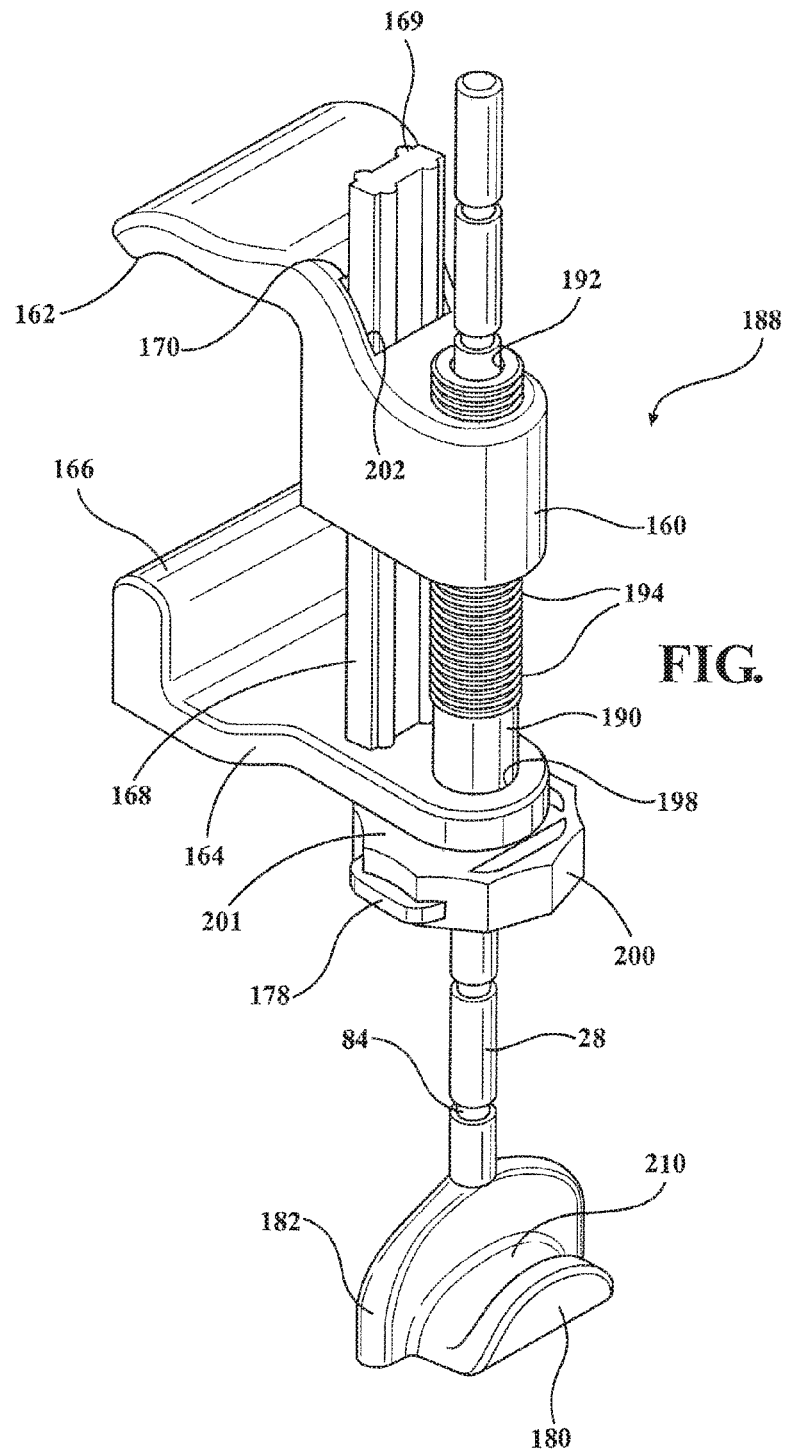
FIG. 22 is a perspective view of a sub-variant of the upper hanger assembly depicted in FIG. 19 and illustrating a shaft supported in extending fashion between the upper and lower clamping portions, the shaft exhibiting exterior threads mating with interior threads associated with the upper clamping portion for displacing the same in directions towards and away from the lower clamping portion.

FIG. 22 is a perspective view of a sub-variant, generally at 188 of the upper hanger assembly depicted in FIG. 19, and which is similar in most respects except as to the removal of the coil spring 174 and its substitution with by a shaft 190 supported in extending fashion between the upper 160 and lower 164 clamping portions. As further shown in the linear cutaway of FIG. 23, the shaft 190 is sleeve shaped with a hollow communicating interior (see at 192 for receiving the stem 26 in extending fashion therethrough), the stem 190 also exhibiting exterior threads 194, these mating with interior threads 196 associated with a communicating interior of the upper clamping portion 160 for displacing the same in directions towards and away from the lower clamping portion 164. Without limitation, it is envisioned that the shaft 190 can be reconfigured with other linear/axial adjustment structure (such as tab/slot or the like) and in order to effectively reposition the separation distance between the upper and lower clamping members.

As further shown, the through aperture is formed in the lower clamping portion 164 (this depicted by inner rim 198 in each of FIGS. 22 and 23) and through which is received the shaft 190, including a lower most smooth exterior surface portion, in upwardly extending fashion. As also shown, a variation of a knob, at 200, incorporating a dent mechanism is integrated into a lower enlarged end of the shaft 196, the communicating interior 192 likewise extending through the lower knob 200. In the illustrated variant, the underside of the lower clamping member 164 seats upon an upper surface 201 of the end-integrated knob 200 such that, subsequent rotation of the shaft 190 results in bidirectional adjustment of the upper clamping member 160 relative to the lower supported clamping member 164.

Figure 23:
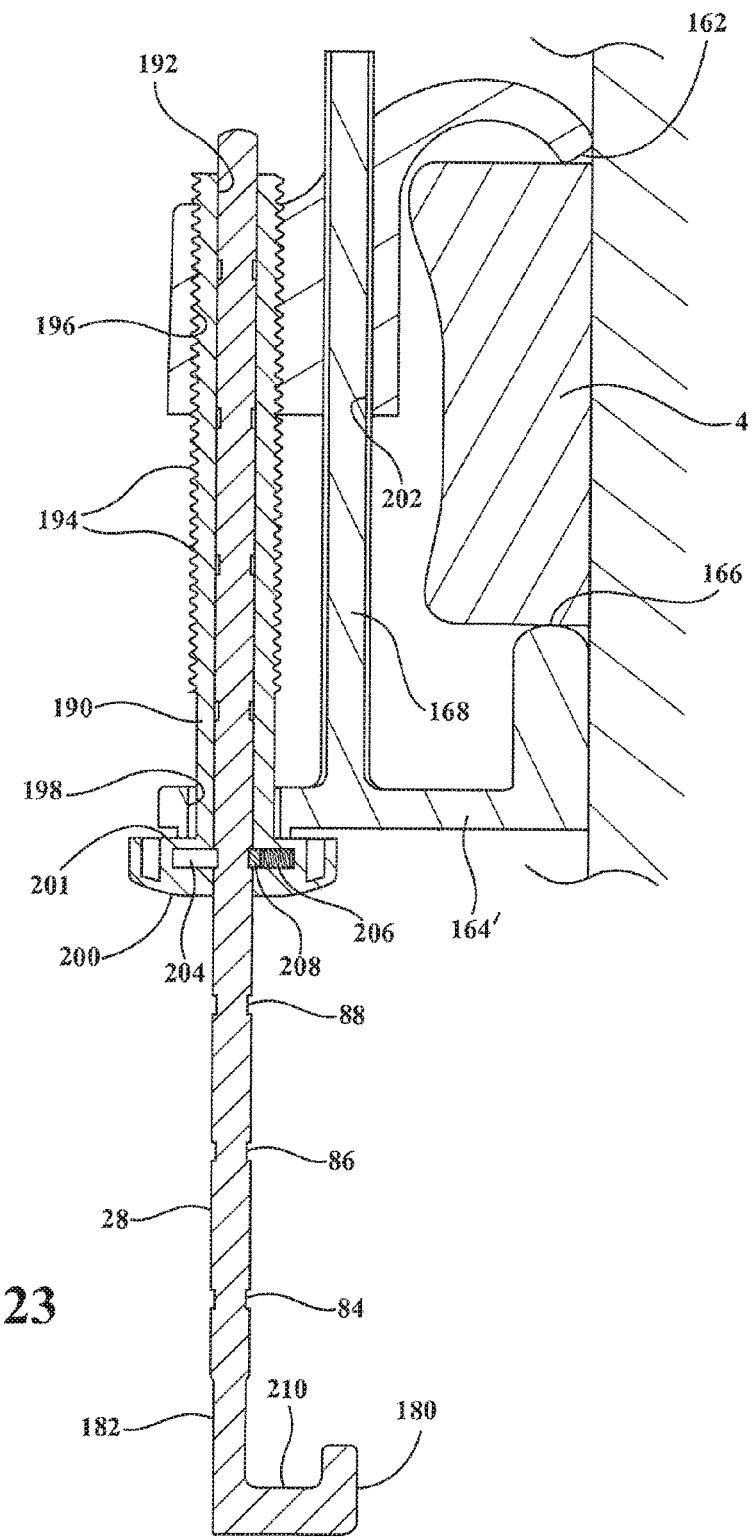
FIG. 23 is a linear cutaway of the upper hanger assembly depicted in FIGS. 22.

The elongated pedestal 168 with keyed cross sectional profile 169 is again depicted and which extends integrally from the lower clamping member 164 and upwardly through the mating keyed recess profile 170 defined in the upper clamping member 160 for accommodating a range of separation adjustability between the clamping members 160 and 164. Given the support and threaded adjustability of the shaft 190, the elongated pedestal 169 in this variant seats through an aperture 202 in the upper clamping member 160 and can be either seating through another aligning keyed aperture in the lower clamping member or alternatively can be integrated into the lower clamping member (such modified as shown at 164' in FIG. 23). In either instance, the pedestal 168 operates in this variant for preventing rotation of the clamping portions 160 and 164 relative to one another during threaded rotation to linear adjusted tightening for engaging the opposite edges of the jamb 4 as shown in FIG. 23.

The variant of the stem 28 depicted in FIG. 19 is again shown and extends through the communicating interior 192 in the vertical shaft 190 and through the reconfigured knob 200 integrated into the lower end thereof. The detent mechanism integrated into knob 200 likewise can incorporate any suitable tab or slot or other structure for adjusting a separation distance between the jamb engaging surfaces of the clamping members and includes the plate shaped detent 178 described in FIG. 19 which is laterally displaceably mounted within an open interior of the knob 200.

As again previously described, the detent includes an inner defined slot (see at 204 in FIG. 23) with biasing spring 206 for retracting an inner keyed portion 208 of the detent 178 against the spring bias (and in response to pressing in the plate shaped detent) and in unseating fashion from a selected one of the successively positioned keyed recessed locations 84, 86, 88, et seq., for effecting quick linear adjustment of the garment supporting stem. As also depicted in FIG. 19, a lower-most terminating end location of the stem 28 includes the modified and arcuate support location 180 associated with the reconfigured lower portion 182, such exhibiting therebetween a recessed and upper accessible arcuate support surface 210 for receiving the upper hook engaging portion 8 of the conventional hanger 6 (see again FIG. 19).

Figure 24:
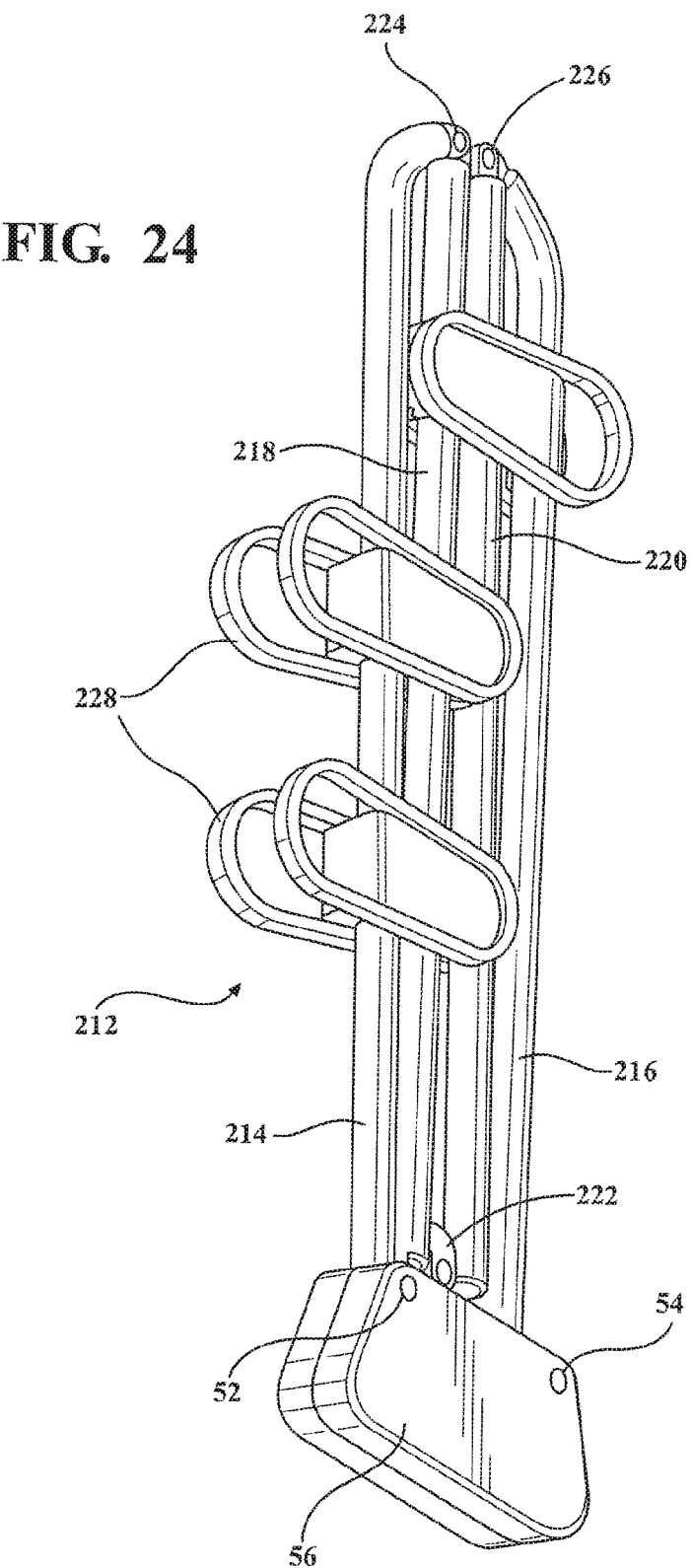
FIG. 24 is an illustration of the lower triangular shaped tensioning/weighting assembly depicted in FIG. 1.

Finally, FIG. 24 is an illustration of a lower triangular shaped tensioning/weighting subassembly 212, similar to as depicted in FIG. 1, in a collapsed and storage position. Additional to the variant depicted in FIG. 1, the lower triangular shaped member can be utilized apart from the upper triangular shaped collapsible member, such as in combination with the height adjustable stem 28 of FIGS. 19, 22 & 23 for providing weighted tensioning of the article during stem cleaning.

As with the upper collapsible triangular shaped member (see again FIGS. 5-7), the lower triangular shaped subassembly includes first 214 and second 216 angled sides which are pivotally interconnected to each of the weighted bottom portion (previously also shown at 56) via hinged end locations 52/54, as well as being hingedly connected to split intermediate or middle extending portions 218 and 220, via a middle hinged location 222 and opposite end hinged locations 224/226 in communication with the angled sides 214/216. A similar arrangement of spaced apart spring clips 228 are provided and which are positioned along the bottom inter-extending split portions 218/220.

It is understood that the present invention is not limited to the specific construction of any of the previously described variants, and which are intended to be representative of a number of different potential configurations and constructions for providing the features of secure elevated support to the assembly, this combined with uninhibited rotation of the hanger and the ability to undertake quick height adjustment of the stem. Without limitation, each of the components integrated into the present assembly can exhibit any material construction, not limited to durable plastic, lightweight metal or the like.

It is also envisioned that the upper assembly can be further reconfigured to incorporate any resilient biasing material and/or be redesigned in order to provide for a biasing engagement of the upper and lower jamb surfaces without having to incorporate distance adjustability features. Additional variants can also include the stem being anchored in place within the housing, and or being linearly height adjustable through an intermediate bracket or other support slidingly engageable with the housing. It is also envisioned that an additional miniaturized motor drive can be provided and which can be installed or otherwise integrated into the upper assembly to facilitate constant and non-manual rotation of the stem and hanger support.

Advantages and other features provided by the hanger system include each of the ability to quickly and efficiently steam clean one or more garments at a time, the retractability/portability of the device when traveling (again FIGS. 5-7), as well as the ability to support the assembly upon a door frame or shower rod with the adjustable clamping structure, such as in particular for fitting various door frame sizes. Additional advantages include the assembly being rotatable a full 360° which removes much of the effort of moving and repositioning garments in conventional ironing operations.

The lower hanger assembly further provides for maintaining the garment in a straight and wrinkle free inducing condition. The combination of the upper and lower hanger assemblies further optimizes the application of the present system to other non-traditional garment stem cleaning operations in use with pillow cases, sheets, curtains and the like.

Having described my invention, other and additional preferred embodiments will become apparent to those skilled in the art to which it pertains, and without deviating from the scope of the appended claims.

I claim:

1. A system for rotatably supporting a garment, comprising:
   a housing configured for suspending from an elevated support having an upper clamping member exhibiting an upper engaging hook edge and a separate lower clamping member exhibiting an upper projecting edge which are collectively adapted to engage upper and lower surfaces of the elevated support;
   a shaft supporting said upper and lower clamping members in axially inter-adjustable fashion;
   a stem extending downwardly from said housing through an aperture in said shaft, said stem being freely rotatable and terminating in a hanger supporting portion for retaining the garment; and
   a detent mechanism integrated into either of said lower clamping member or shaft for permitting linear adjustment of said stem between a plurality of succeeding keyed recessed locations defined therealong.

2. The system as described in claim 1, said shaft further comprising a plurality of exteriorly positioned threads along an extending distance thereof, an aperture in said upper clamping member having a further plurality of interiorly positioned threads which receive said exterior threads.

3. The system as described in claim 2, a smooth exterior surface portion of said shaft seating through an aperture in said lower clamping member, said lower clamping member being supported upon an upper surface of a knob integrated into an end of said shaft, said knob forming a portion of said detent mechanism.

4. The system as described in claim 1, further comprising an elongated pedestal exhibiting a keyed cross sectional profile and extending integrally from said lower clamping member upwardly through a mating keyed recess profile defined in said upper clamping member for accommodating adjustment between said clamping members by said shaft.

5. The system as described in claim 1, said stem further comprising a plurality of spaced apart recess locations, said detent mechanism including a spring biased portion which engages with a first selected one of said recess locations, upon depressing a projecting plate of said detent which is communication with said spring biased portion, said stem being axially reposition until a second selected recess location is engaged by said spring biased portion upon release thereof.

6. The system as described in claim 1, a bottom extending portion of said stem further comprising an arcuate support portion adapted to receive a hook of a conventional hanger.

7. The system as described in claim 6, further comprising a lower hanger supporting subassembly including a triangular frame defining hanger including a pair of angled side members and an upper inter-extending member, a plurality of clamps arranged in spaced apart fashion along said inter-extending member and which are configured for engaging a lower edge of a garment adapted to being supported upon the hanger.

8. The system as described in claim 7, said inter-extending member further comprising first and second split halves which are pivotally interconnected, a plurality of additional pivot locations established at each of opposite interconnecting ends of said angled side members to facilitate fold-up storage of said hanger supporting portion.

9. The system as described in claim 8, further comprising a weighted portion supported upon said triangular frame for tensioning the garment.

10. The system as described in claim 1, said hanger supporting portion further comprising an upper hanger subassembly including a triangular frame defining hanger including a pair of angled side members and a bottom extending and interconnecting member, a plurality of clamps arranged in spaced apart fashion along said bottom extending member and which are configured for engaging the garment.

11. The system as described in claim 10, said bottom extending member farther comprising first and second split halves which are pivotally interconnected, a plurality of additional pivot locations established at each of opposite interconnecting ends of said angled side members to facilitate collapsed storage of said hanger sub-assembly.

12. A system for rotatably supporting a garment, comprising:
   a housing configured for suspending from an elevated support having an upper clamping member exhibiting an upper engaging hook edge and a separate lower clamping member exhibiting an upper projecting edge which are collectively adapted to engage upper and lower surfaces of the elevated support;

a shaft supporting said upper and lower clamping members in axially inter-adjustable fashion;

a plurality of exteriorly positioned threads along an extending distance of said shaft, an aperture in said upper clamping member having a further plurality of interiorly positioned threads which receive said exterior threads;

a smooth exterior surface portion of said shaft seating through an aperture in said lower clamping member, said lower clamping member being supported upon an upper surface of a knob integrated into an end of said shaft;

an elongated pedestal exhibiting a keyed cross sectional profile and extending integrally from said lower clamping member upwardly through a mating keyed recess profile defined in said upper clamping member for accommodating adjustment between said clamping members by said shaft;

a stem extending downwardly from said housing through an aperture in said shaft, said stem being freely rotatable and terminating in a hanger supporting portion for retaining the garment; and a detent mechanism integrated into said knob for permitting linear adjustment of said stem between a plurality of succeeding keyed recessed locations defined therealong.

13. The system as described in claim 12, said stem further comprising a plurality of spaced apart recess locations, said detent mechanism including a spring biased portion which engages with a first selected one of said recess locations, upon depressing a projecting plate of said detent which is communication with said spring biased portion, said stem being axially reposition until a second selected recess location is engaged by said spring biased portion upon release thereof.

14. The system as described in claim 12, a bottom extending portion of said stem further comprising an arcuate support portion adapted to receive a hook of a conventional hanger.

15. The system as described in claim 14, further comprising a lower hanger supporting subassembly including a triangular frame defining hanger including a pair of angled side members and an upper inter-extending member, a plurality of clamps arranged in spaced apart fashion along said inter-extending member and which are configured for engaging a lower edge of a garment adapted to being supported upon the hanger.

16. The system as described in claim 15, said inter-extending member further comprising first and second split halves which are pivotally interconnected, a plurality of additional pivot locations established at each of opposite interconnecting ends of said angled side members to facilitate fold-up storage of said hanger supporting portion.

17. The system as described in claim 16, further comprising a weighted portion supported upon said triangular frame for tensioning the garment.

18. The system as described in claim 12, said hanger supporting portion further comprising an upper hanger sub-assembly including a triangular frame defining hanger including a pair of angled side members and a bottom extending and interconnecting member, a plurality of clamps arranged in spaced apart fashion along said bottom extending member and which are configured for engaging the garment.

19. The system as described in claim 18, said bottom extending member further comprising first and second split halves which are pivotally interconnected, a plurality of additional pivot locations established at each of opposite interconnecting ends of said angled side members to facilitate collapsed storage of said hanger sub-assembly.

20. A system for rotatably supporting a garment, comprising:

a housing configured for suspending from an elevated support having an upper clamping member exhibiting an upper engaging hook edge and a separate lower clamping member exhibiting an upper projecting edge which are collectively adapted to engage upper and lower surfaces of the elevated support;

a shaft supporting said upper and lower clamping members in axially inter-adjustable fashion;

an elongated pedestal exhibiting a keyed cross sectional profile and extending integrally from said lower clamping member upwardly through a mating keyed recess profile defined in said upper clamping member for accommodating adjustment between said clamping members by said shaft;

a stem extending downwardly from said housing through an aperture in said shaft, said stem being freely rotatable and terminating in a hanger supporting portion for retaining the garment;

a bottom extending portion of said stem further comprising an arcuate support portion adapted to receive a hook of a conventional hanger; and a detent mechanism integrated into either of said lower clamping member or shaft for permitting linear adjustment of said stem between a plurality of succeeding keyed recessed locations defined therealong.

* * * * *